May 16, 1950     A. H. LANSER     2,507,913
LANDING GEAR FOR AIRPLANES
Filed July 7, 1948
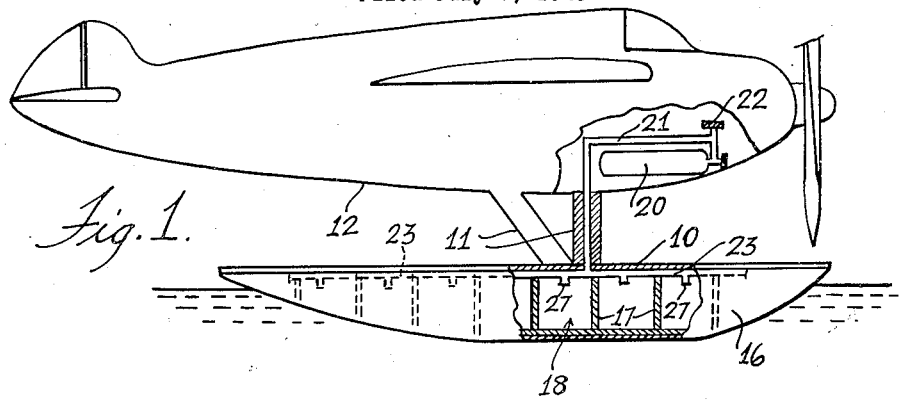
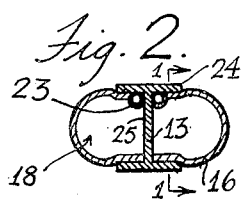 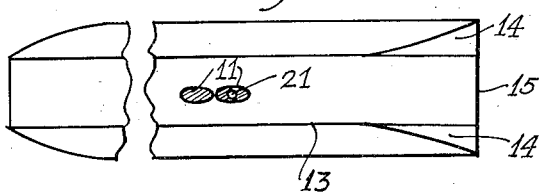
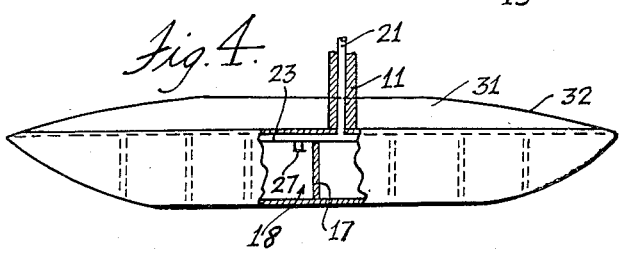
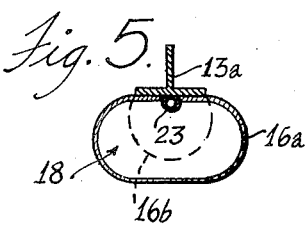 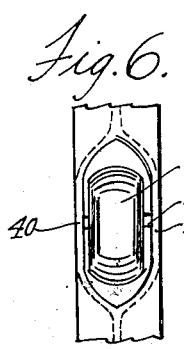 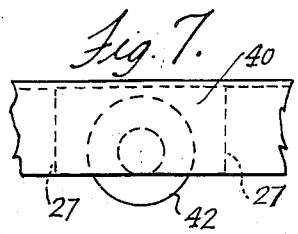
INVENTOR.
ALFRED HENRI LANSER
BY Worth Wade
ATTORNEY Patented May 16, 1950

2,507,913

UNITED STATES PATENT OFFICE 2,507,913

LANDING GEAR FOR AIRPLANES

Alfred Henri Lanser, New York, N. Y.

Application July 7, 1948, Serial No. 37,411

2 Claims. (Cl. 244—105)

This invention relates in general to landing gear for airplanes, in particular landing floats for amphibious planes and sea planes.

Heretofore landing gear for amphibious and sea planes have been formed of rigid plywood or metal, the buoyancy being determined by the displacement. However, even with small planes which land at relatively low speeds, the shock which occurs when the float first strikes the water is in many cases so great that damage occurs to a rigid float. In many instances the damage results in splintering, splitting or crushing of the float and such damage is difficult to repair. Another great handicap of such rigid floats is their tremendous weight which, of course, decreases the pay load of the airplane and increases the fuel consumption in flight.

It is the object of the present invention to provide a resilient float which will be more resistant to damage in striking the water on landing than prior floats.

According to the present invention, there is provided a float for the landing gear of amphibious or sea planes comprising an inflatable elongated float having a gas retaining wall formed of a polyolefine resin. In a preferred embodiment the inflatable float is reinforced at least longitudinally by a rigid beam and the gas container is segmented to provide a plurality of cells with means to inflate the cells with a gas, such means being operable from the cockpit of the plane.

Referring to the drawing:

Fig. 1 is a side elevation, partly in section, of an aircraft showing one embodiment of the landing gear of the present invention;

Fig. 2 is a cross section of the float shown in Fig. 1, taken along the line 2—2 thereof;

Fig. 3 is a top plan view of the front of one of the floats illustrated in Fig. 1;

Fig. 4 is a side elevation, partly in section, of a second embodiment of the float;

Fig. 5 is a cross-section of the float of Fig. 4 taken along the line 5—5 thereof.

Fig. 6 is a top plan view of a section of the float incorporating a wheel;

Fig. 7 is a side-elevation of the section shown in Fig. 6.

Referring to Figs. 1, 2 and 3, the float 10 is fixed to the lower ends of one or more struts 11 the other ends of which are fastened to the airplane 12. The float comprises a stiffening member such as a beam 13, for example, an I beam of metal. The front end of the beam is preferably widened by means of the flanges 14 so as to provide the float with a wide sharp front edge 15. The beam supports and is partly or completely enclosed by a gas bag 16, the walls of which are formed of or coated with a film of a poly-olefine resin. Preferably the interior is separated by partitions 17 of the same material to form independent gas cells 18. The edges of the film forming the walls of the gas bag 16 may be sealed by suitable means to the beam or, in a preferred embodiment the bag is formed completely of the resin film and one bag is fixed to each side of the beam as shown in Fig. 2.

Gas, such as air, nitrogen, helium or carbon dioxide, may be supplied to the interior of the bags 16 by taking it from gas tank 20, preferably positioned inside or attached to the airplane, by means of a line 21 having a valve 22 located preferably within the cock-pit of the plane as shown in Fig. 1. The gas line runs down the strut 11 to the floats, and a branch thereof 23 runs to each end of the float. At the point where the strut joins the beam, the branches pass through a hole in the upper flange 24 of the beam and then extend on both sides of the vertical part 25 of the beam as shown in Fig. 2. Thus the gas can be piped to all segments or cells of each of the bags in each float. Suitable one-way valves 27 are provided at the point 26 where the line 23 enters the cells, so that one cell can be punctured and deflate without causing deflations of the remaining cells of the bag.

While Fig. 2 shows an I beam and a pair of gas bags, one on each side; the float may be formed with a T beam 30 and a single gas bag 16a. In the preferred embodiment the T beam has a curve to the upper flange 31 as shown in Fig. 4 and the ridge 32 tapers toward both ends.

The floats of the invention may be provided with one or more wheels for amphibious airplanes. As shown in Fig. 6 a novel manner of mounting such wheels is to use a beam divided at a suitable point to form a pair of side plates 40 which carry the axle 41 of a wheel 42, the lower edge of which protrudes beneath the float to permit landing on a flying field, as shown in Fig. 7.

It is characteristic and novel in this invention to employ as the walls of the gas bag in the floats, a film formed of a film-forming poly-olefine resin, such for example, as a polyvinyl resin, a polyethylene resin, a poly-butylene resin, a poly-isobutylene resin, a butadiene polymer, and ester and ether derivatives of these olefines, such as acrylate resins, poly-styrene resins, and co-polymers such for example as the co-polymer of vinyl acetate and vinyl chloride, the co-polymer of vinyl chloride and iso-butylene. The term "poly-olefine resin" as used herein is intended to include resins formed from the olefine hydrocarbons and their derivatives. All such resins are characterized by waterproofness, toughness and resistance to shock and abrasion. They have a substantial amount of elasticity and resiliency which are functionally important in this invention. The resin film may be used alone as the wall of the gas bag or reinforced by laminating or coating it upon a flexible reinforcement such as paper, fabric or felt. In a preferred embodiment the resin is a co-polymer of vinyl acetate and vinyl chloride (84%) and has a molecular weight above 7,500, and is not reinforced.

I claim:

1. In a landing gear for sea-planes, an inflatable elongated landing float comprising a metal I beam extending longitudinally of the float, a gas bag formed of a poly-olefine resin attached to said I beam only along a longitudinal area of the bag leaving the remaining area of the bag free to expand and contract, and means to inflate said bag.

2. A landing gear as recited in claim 1 in which a separate gas bag is attached as specified in claim 1 to each longitudinal side of the I beam.

ALFRED HENRI LANSER.

REFERENCES CITED

The following references are of record in the file of this patent:

UNITED STATES PATENTS

| Number | Name | Date |
| --- | --- | --- |
| 1,270,200 | Peterson | June 18, 1919 |
| 1,489,619 | Tsavaris | Apr. 8, 1924 |
| 1,693,773 | Anderson | Dec. 4, 1928 |
| 2,375,973 | Cooper | May 15, 1945 |

OTHER REFERENCES

"Washington Post" issue of November 2, 1940, page 21, picture of a boat frame covered with a transparent resin plastic. A photostat may be ordered or the reference may be seen in Division 61 in Class 9/6.